United States Patent [19]

Hirose et al.

[11] Patent Number: 4,798,781
[45] Date of Patent: Jan. 17, 1989

[54] FABRICATION PROCESS OF OPTICAL RECORDING MEDIUM

[75] Inventors: Sumio Hirose, Yokohama; Hiroshi Ozawa, Isehara; Kenji Abe; Yoichi Hosono, both of Yokohama, all of Japan

[73] Assignees: Mitsui Toatsu Chemicals, Incorporated, Tokyo; Yamamoto Chemicals, Inc., Yao, both of Japan

[21] Appl. No.: 891,178

[22] Filed: Jul. 31, 1986

[30] Foreign Application Priority Data

Aug. 6, 1985 [JP] Japan .................. 60-171787

[51] Int. Cl.$^4$ .................. G11B 7/24; G01D 9/00; G03C 1/72; G03C 5/16
[52] U.S. Cl. .................. 430/270; 430/495; 430/945; 346/135.1
[58] Field of Search .............. 430/945, 276, 495, 935; 346/76 L, 135.1

[56] References Cited

U.S. PATENT DOCUMENTS

| | | | |
|---|---|---|---|
| 4,298,975 | 11/1981 | van der Veen et al. | 369/94 |
| 4,471,039 | 9/1984 | Boresberger et al. | 430/945 |
| 4,529,688 | 7/1985 | Law et al. | 430/945 |
| 4,626,496 | 12/1986 | Sato | 430/945 |
| 4,719,613 | 1/1988 | Hirose et al. | 430/495 |

Primary Examiner—Paul R. Michl
Assistant Examiner—Mark R. Buscher
Attorney, Agent, or Firm—Oblon, Fisher, Spivak, McClelland & Maier

[57] ABSTRACT

Disclosed herein is a fabrication process of an optical recording medium permitting writing and reading-out of signals without any reflective layer. The medium is fabricated by coating, on a transparent thermoplastic resin substrate havnig pregrooves and pits or holes for preformatting signals, a dye solution of a phthalo/naphthalocyanine dye represented by the following general formula (I):

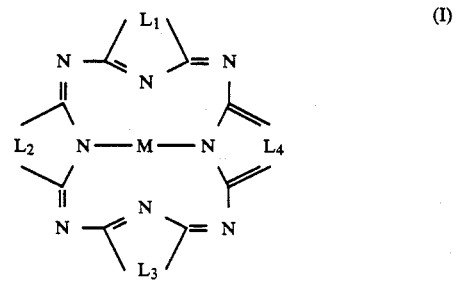

wherein M means a metal, metal oxide or metal halide, and $L_1$, $L_2$, $L_3$ and $L_4$ mean individually a benzene or naphthalene ring skeleton which is unsubstituted or substituted by at least one monovalent substituent —Z selected from the class consisting of the following substituents: —$R^1$, —$OR^2$, —$SiR^3R^4R^5$, —$SR^6$, —$COR^7$, —$COOR^8$, —$COHNR^9$, —$NR^{10}R^{11}$, —$R^{12}OR^{13}$, and —$R^{14}X$ wherein $R^1$–$R^{14}$ denote individually a hydrocarbon group having from 1 to 12 carbon atoms and X stands for a halogen atom.

16 Claims, 1 Drawing Sheet

FABRICATION PROCESS OF OPTICAL RECORDING MEDIUM

BACKGROUND OF THE INVENTION (1) Field of the Invention

This invention relates to a fabrication process of write-once optical recording media, and more specifically to a process for the fabrication of optical recording media useful as external memories for computers and for recording various information such as video and audio information.

(2) Description of the Prior Art

As write-once optical recording media of the above-described sort, there have been proposed recording media having inorganic recording layers of thin films of low melting-point metals such as tellurium, tellurium alloys and bismuth alloys, and as disclosed in U.S. Pat. No. 4,298,975 for example, recording media making use of phthalocyanine dyes as recording layers.

These recording media are however accompanied by a problem that their productivities are all low, since their recording layers must be formed in vacuo by vacuum evaporation, sputtering or the like. Furthermore, media having inorganic recording layers are limited in recording density due to the greater thermal conductivities of the recording layers. There is also a potential danger with respect to toxicity since they employ poisonous materials such as tellurium. On the other hand, optical recording media containing phthalocyanine dyes as recording layers usually require a shifting treatment in which recording layers obtained generally by vacuum evaporation are exposed to heat or vapor of an organic solvent, because the optical characteristics of the recording layers are not sensitive to the oscillation wavelengths of semiconductor lasers. This shifting treatment is cumbersome and takes as long as 1-72 hours. Therefore, these phthalocyanine-containing optical recording media have not yet found actual utility.

With a view toward providing a solution to the above-mentioned problems, optical recording media with recording layers formed by coating soluble organic dyes have been proposed. For example, processes making use of the spin coating technique have been developed to coat organic dyes which are soluble in an organic solvent and exhibit absorption in the oscillation wavelength range of semiconductor lasers, such as dithiol metal complexes, polymethine dyes, squarylium dyes and naphthoquinone dyes. Some of these processes have already been practiced.

Conventional recording media containing for example polymethine dyes and sqarylium dyes as recording layers out of the dyes proposed to date were however accompanied by a drawback that they had poor durability. On the other hand, those provided solely with recording layers of dyes such as dithiol metal complexes involved a problem that additional thin reflective layers made of inorganic materials such as metal or metal oxide were required because such recording layers had low reflectances inherently.

For example, U.S. Pat. No. 4,492,750 relates to media which use alkyl-substituted naphthalocyanine dyes. It discloses an optical recording medium having (1) a reflective layer of a material such as Al provided on a glass or polymethyl methacrylate substrate; and (2) a layer of an optical recording composition provided on the reflective layer and containing vapor-treated particles of an alkyl-substituted naphthalocyanine dye, the particle sizes of which range from 0.005 μm to 0.1 μm, dispersed in a polymeric binder. As disclosed in the above U.S. patent, the optical recording layer cannot be formed directly on the substrate and the reflective layer made of an inorganic material such as Al must be formed additionally on the substrate by a vacuum process such as vacuum evaporation. The fabrication process of the optical recording medium is thus rather complicated. In addition, the above optical recording medium is accompanied by a more serious problem. A recording layer making use of an organic dye has an inherent feature, that is, a low thermal conductivity. Hence, it is potentially expected to exhibit high recording sensitivity. When a reflective layer made of a high thermal-conductivity metal or inorganic material is provided, the thermal energy produced by a writing laser beam irradiated onto the recording layer is however caused to dissipate through the reflective metal layer due to the high thermal conductivity of the reflective metal layer, so that the thermal energy is not effectively used for the formation of pits or holes (which correspond to signals). As a result, the recording sensitivity is reduced to a considerable extent. Let's now assume that a reflective layer made of an inorganic material such as Al is provided. When a laser beam is irradiated through the substrate for writing signals or reading them out, the laser beam is not allowed to reach the recording layer even if the substrate per se is transparent. This is obvious because the laser beam is shut off by the reflective layer of the inorganic material which practically prevents transmission of light therethrough. Whenever such a reflective layer is provided, it is naturally impossible to perform the writing and reading-out of signals through the associated substrate. Accordingly, the writing and reading-out of signals have to be conducted on the side of the recording layer. In this case, slightest existence of dust or scratches on the surface of the recording layer results in considerable disturbance to the accurate writing and reading-out of signals which take the form of pits or holes. For practical application, the above-mentioned optical recording medium thus requires a dust protective layer as an overcoat on the recording layer. If it becomes feasible to conduct the writing and reading-out of signals by means of a laser beam through a transparent substrate, such a dust protective layer will not be required at all. Because the existence of dust or scratches on the medium surface on the incident side of the laser beam, where the laser beam is still unfocused, has no effect on writing and reading-out of the signals.

Even if such dithiol metal complexes, polymethine dyes, squarylium dyes and naphthoquinone dyes can be formed into recording layers by coating techniques, an investigation of the present inventors revealed that when they were coated on thermoplastic resin substrates having pregrooves for controlling writing positions and/or pits or holes for preformating signals (i.e., substrates made of a thermoplastic resin and having such pits or holes), the resulting media often got into tracking servo troubles and were unable to perform control of writing positions and hence to write and read out signals. It seems that a dye solution did some damage to such pregrooves while coating the recording layers. However, no exact cause or causes have been found yet obviously.

In the case of such conventional organic dyes as described above, pregrooves and pits or holes for performatting signals or the like were formed in a layer of thermosetting resin such as a u.v. curable resin, said layer being formed on smooth thermoplastic resin substrates, followed by coating of dye solutions on the pregroove- and pit- or hole-defining surface of the thermosetting resin layer.

However, the formation of such pregrooves and pits or holes or using a thermosetting resin like the above-mentioned u.v. curable resin requires an additional step and hence complicates the fabrication process. Accordingly, this process is not preferable from the viewpoints of productivity and economy. For the reasons described above, it has been strongly desired to develop a process permitting use of a thermoplastic resin substrate with pregrooves and pits or holes which have been formed by a stamper while molding the substrate.

SUMMARY OF THE INVENTION

An object of this invention is to provide a fabrication process of an optical recording medium which permits writing and reading-out of signals without need for any reflective layer.

Another object of this invention is to provide a fabrication process of an optical recording medium which owing to the exclusion of reflective layer, permits writing and reading-out of signals by a laser beam irradiated through its transparent substrate.

A further object of this invention is to provide a process for fabricating such an optical recording medium as described above by a coating technique, which is industrially most desirable in view of productivity and economy, without relying upon any irksome technique such as vacuum evaporation or sputtering.

A still further object of this invention is to provide a process for fabricating such an optical recording medium by coating a dye solution directly on a transparent thermoplastic resin substrate which has pregrooves and pits or holes for preformatting signals.

Other objects of this invention will become apparent from the following description.

The above and other objects of this invention can be attained by the provision of the following fabrication process:

A process for the fabrication of an optical recording medium permitting writing and reading-out of signals without any reflective layer made of an inorganic compound, which comprises:

(a) providing a phthalo/naphthalocyanine dye represented by the following general formula (I):

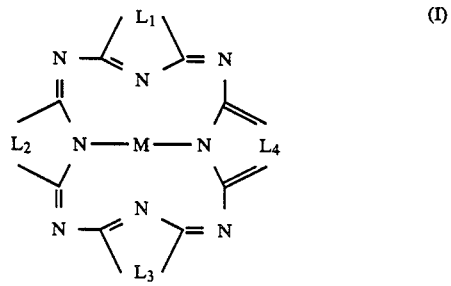

wherein M means a metal, metal oxide or metal halide, and $L_1$, $L_2$, $L_3$ and $L_4$ mean individually a benzene or naphthalene ring skeleton which is unsubstituted or substituted by at least one monovalent substituent —Z selected from the class consisting of the following substituents:
—$R^1$,
—$OR^2$,
—$SiR^3R^4R^5$,
—$SR^6$,
—$COR^7$,
—$COOR^8$,
—$CONHR^9$,
—$NR^{10}R^{11}$,
—$R^{12}OR^{13}$, and
—$R^{14}X$ wherein $R^1$–$R^{14}$ denote individually a hydrocarbon group having from 1 to 12 carbon atoms and X stands for a halogen atom;

(b) dissolving the phthalo/naphthalocyanine dye in an organic solvent having a solubility parameter smaller than 8.5, thereby preparing a dye solution; and (c) coating the dye solution on a transparent thermoplastic resin substrate surface having pregrooves and pits or holes for preformatting signals, thereby forming a recording layer comprising the phthalo/naphthalocyanine dye on the pregroove- and pit- or hole-defining surface of the resin substrate.

DETAILED DESCRIPTION OF THE INVENTION

Figure 1:
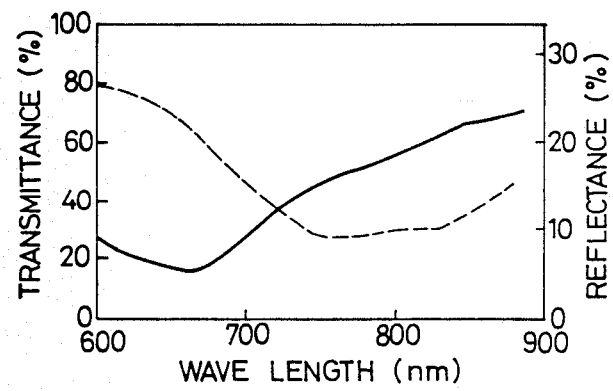
FIG. 1 diagrammatically illustrates the wavelength dependency of the transmittance and reflectance of a recording layer of tetra-6-tert-heptyl-2,3-naphthalocyaninevanadyl dye (layer thickness: 120 nm).

In the present invention, it is preferable to write or read out signals by optical beams through a transparent resin substrate because such writing or reading-out is almost not affected by dust, scratches, etc. As the transparent resin substrate useful in the practice of this invention, it is desirable to employ such a substrate as having a light transmittance of 85% or higher and little optical anisotropy.

These transparent resin substrates usually have pregrooves for positional control and pits or holes for signals such as address and various marks. In the present invention, these pregrooves and pits or holes are formed by a stamper while molding (injection, compression or the like) of the thermoplastic resin substrates. No particular limitation is imposed on the thicknesses of these resin substrates. They may take either plate-like or film-like forms. Their thicknesses may usually range from about 50 μm to about 5 mm or so. They may also be in the form of either disks or cards. No particular limitation is imposed on their sizes.

As specific examples of the resin usable in the transparent resin substrate employed in the present invention, may be mentioned thermoplastic resins such as acrylic resins, polycarbonate resins, polystyrene resins, polyester resins, polyamide resins, vinyl chloride resins, polyvinyl ester resins, polyolefin resins (poly-4-methylpentene, etc.) and polyether sulfon resins. Of these, polycarbonate resins are preferred in view of their optical and mechanical characteristics.

In the present invention, a recording layer comprising a phthalo/naphthalocyanine dye represented by the following general formula (I) is formed on a transparent thermoplastic resin substrate, which has pregrooves and pits or holes for preformatting signals, by coating the substrate with a solution of the phthalo/naphthalocyanine dye dissolved in an organic solvent having a solubility parameter smaller than 8.5:

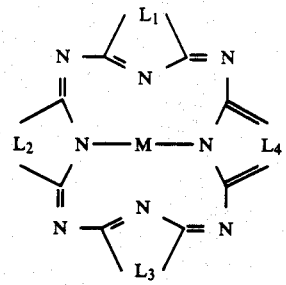

(I)

wherein M means a metal, metal oxide or metal halide, and $L_1$, $L_2$, $L_3$ and $L_4$ mean individually a benzene or naphthalene ring skeleton which is unsubstituted or substituted by at least one monovalent substituent —Z selected from the class consisting of the following substituents:
—$R^1$,
—$OR^2$,
—$SiR^3R^4R^5$,
—$SR^6$,
—$COR^7$,
—$COOR^8$,
—$CONHR^9$,
—$NR^{10}R^{11}$,
—$R^{12}OR^{13}$, and
—$R^{14}X$ wherein $R^1$-$R^{14}$ denote individually a hydrocarbon group having from 1 to 12 carbon atoms and X stands for a halogen atom.

As specific examples of the hydrocarbon groups represented by $R^1$-$R^{14}$ in the substituent —Z in the phthalo/naphthalocyanine dye represented by the general formula (I) and useful in a recording layer in the present invention, may be mentioned alkyl groups such as methyl, ethyl, n-propyl, iso-propyl, n-butyl, iso-butyl, sec-butyl, tert-butyl, n-amyl, iso-amyl, sec-amyl, tert-amyl, n-hexyl, iso-hexyl, 1-methyl-1-ethylpropyl, 1,1-dimethylbutyl, n-heptyl, tert-heptyl, octyl, 2-ethylhexyl, nonyl, decyl and dodecyl; alkenyl groups such as vinyl and allyl; a phenyl group such as phenyl; and substituted phenyl groups such as tolyl(methylphenyl) and xylyl(dimethylphenyl). As specific examples of the halogen X, may be mentioned fluorine, chlorine, bromine, iodine and so on.

As more specific examples of the substituent —Z, may be mentioned as —$R^1$, an alkyl, alkenyl, phenyl or substituted phenyl group such as that described above; as —$OR^2$, methoxy, ethoxy, butoxy, octoxy, dodecanoxy, allyloxy, phenoxy or dimethylphenyloxy group; as —$SiR^3R^4R^5$, trimethylsilyl, tiethylsilyl or triphenylsilyl group; as —$SR^6$, methylthio, ethylthio, butylthio, octylthio, dodecylthio or phenylthio group; as —$COR^7$, acetyl, ethylcarbonyl, butylcarbonyl, octylcarbonyl, dodecylcarbonyl or benzoyl group; as —$COOR^8$, methoxycarbonyl, ethoxycarbonyl, butoxycarbonyl, octoxycarbonyl, dodecyloxycarbonyl or phenoxycarbonyl group; as —$CONHR^9$, methylcarboxyamide, ethylcarboxyamide, butylcarboxyamide, octylcarboxyamide, dodecylcarboxyamide or phenylcarboxyamide group; as —$NR^{10}R^{11}$, dimethylamino, diethylamino, dibutylamino, dioctylamino or diphenylamino group; as —$R^{12}OR^{13}$, methoxymethyl, ethoxyethyl, butoxyethyl or phenoxyethyl group; and as —$R^{14}X$, chloromethyl, chloroethyl, chlorobutyl, chlorooctyl, chlorododecyl or chlorophenyl group.

On the other hand, specific examples of M in the phthalo/naphthalocyanine dye represented by the general formula (I) may include metals of Group Ib of the Periodic Table, such as Cu; Group II metals such as Mg, Ca, Sr, Zn and Cd; Group III metals such as Al, Ga, In and Tl; Group IV metals such as Ge, Sn, Pb and Ti; Group V metals such as Sb, Bi, V, Nb and Ta; Group VI metals such as Se, Te, Cr, Mo and W; Group VII metals such as Mn and Tc; Group VIII metals such as Fe, Co, Ni, Ru, Rh, Pd, Os, Ir and Pt; and the oxides and halides, such as chlorides, bromides and iodides, of these metals. Although these metals and metal oxides and metal halides are generally divalent, they may each be a mixture of single valency and triple valency. Alternatively, they may also be in the form of dimers coupled together by way of an oxygen.

In the present invention, the phthalo/naphthalocyanine dye represented by the general formula (I) is used by dissolving same in an organic solvent having a solubility parameter smaller than 8.5. In view of solubility in such an organic solvent, the total of carbon numbers in all substituent or substituents —Z per molecule of the phthalo/naphthalocyanine dye of the general formula (I) may preferably at least 20, more preferably, 24 or more. If the total carbon number in the substituent or substituents —Z per molecule of the above-described dye exceeds 48, the reflectance of the resulting dye layer becomes smaller. It is hence not preferable to contain such many carbon atoms. No particular limitation is imposed on the manner of introduction of the substituent or substituents —Z. For example, substituents —Z may be evenly distributed in the four benzene or naphthalene rings of the phthalo/naphthalocyanine dye or one or more substituents —Z may be introduced in only one benzene or naphthalene ring. Further, no particular limitation is imposed on the position of each substituent bound to its associated benzene or naphthalene ring.

As specific combinations of $L_1$, $L_2$, $L_3$ and $L_4$ in the general formula (I), they may all be benzene ring skeletons (phthalocyanine dyes) or naphthalene ring skeletons (naphthalocyanine dyes) or they may be a combination of benzene ring skeleton(s) and naphthalene ring skeleton(s). The expression "phthalo/naphthalo" in the phthalo/naphthalocyanine dyes in the present invention shall be intepreted to to cover all of these combinations. Although $L_1$, $L_2$, $L_3$ and $L_4$ mean individually a benzene or naphthalene ring skeleton as defined before, it is preferable from the viewpoint of the absorption and reflection wavelength of the resulting dye layer that at least 3 of $L_1$, $L_2$, $L_3$ and $L_4$ are the above-mentioned naphthalene ring skeletons, with so-called naphthalocyanine dyes in which all of them are the above-mentioned naphthalene ring skeletons being most preferred.

From the standpoint of the above-mentioned absorption and reflection of laser beams by the dye layer, metals such as Cu, Ni, Mg, Pd, Co, Nb, Sn, In, Ge, Ga, V, Ti, Al and W as well as the oxides and chlorides of these metals are preferred among the above-given examples for M in the phthalo/naphthalocyanine dyes represented by the general formula (I).

The phthalo/naphthalocyanine dyes represented by the general formula (I) may be used either singly or in combination in the present invention.

For example, 6-tert-butyl-2,3-dicyanonaphthalene and AmONa heated in AmOH 7 hours gave tetra-6-tert-butyl-2,3-naphthalocyanine. The latter compound heated with $Cu_2Cl_2$ and ammonium molybdate at 230°–240° C. yielded copper tetra-6-tert-butyl-2,3-naphthalocyanine. Similarly were obtained the AlOH, Zn, $SnCl_2$, VO, Co, Ni, Pd and acetoxymanganese derivatives. These were characterized by their absorption spectra. All have good solubility in organic solvents and the long-wavelength bands of their spectra show a strong bathochromic shift relative to the corresponding phthalocyanines.

The above-described phthalo/naphthalocyanine dyes useful in the practice of this invention can be easily synthesized by a conventional process described in Zh. Obs. Khim, 42, 696–699 (1972) or the like.

Next, the organic solvent employed in dissolving the above-described phthalo/naphthalocyanine dye in the present invention may preferably be an organic solvent having a solubility parameter smaller than 8.5. If an organic solvent having a solubility parameter of 8.5 or greater is used to prepare a dye solution for coating on a thermoplastic resin substrate, it is often difficult to control writing positions of the resulting medium satisfactorily and to perform writing or reading-out of signals successfully although the degrees of such difficulties may vary depending on the type of the organic solvent, coating conditions, the shapes of pregrooves for the control of writing positions and pits or holes of the substrate for preformatting signals. It is therefore not preferable to use solvents having solubility parameters of 8.5 or greater. Such solvents appear to cause some damages to the pregrooves and pits or holes of substrates upon their coating.

Incidentally, the term "solubility parameter" as used herein means a value ($\delta$) determined by the following equation:

$$\delta = \{(\Delta H^v - RT)/V^L\}^{\frac{1}{2}}$$

where $\delta$: solubility parameter
$\Delta H^v$: heat of vaporization
$V^L$: molar volume As $\Delta H^v$, the value calculated from a boiling point in accordance with the Hildebrand rule, namely, $\Delta H_{298}^v = 23.7Tb + 0.020Tb^2 - 2950$ (Tb: boiling point in °K.) shall be used. Accordingly, the solubility parameter should be the value at 298° K. As specific examples of solubility parameters calculated by determining boiling points in accordance with the Hildebrand rule, reference may be made, for example, of Teruzo Asahara, "Solvent Handbook", Kodansha Publishing Company, Tokyo, Japan, in which certain solubility parameters are specifically given on pages 62 and 63. In addition, the calculation method of solubility parameters by the Hildebrand rule is described in J. H. Hildebrand, "Solubility of Nonelectrolytes", 424–427 (1950), Reinhold Publishing Co.

As specific examples of the organic solvent which has a solubility parameter smaller than 8.5 and is useful in the practice of this invention, may for example be mentioned saturated aliphatic hydrocarbons such as pentane, n-hexane, isohexane, 3-methylpentane, neohexane, 2,3-dimethylbutane, n-heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, n-octane, isooctane and other isomers of octane, nonane and its isomers, decane and its isomers, undecane and dodecane; unsaturated aliphatic hydrocarbons such as pentene, hexene and its isomers, hexadiene and its isomers, hexatriene, heptane and its isomers, heptadiene and its isomers, heptatriene, octene and its isomers, octadiene, octatriene, nonene, nonadiene, nonatriene, decene, undecene and dodecene; saturated alicyclic hydrocarbons such as cyclopentane, methylcyclopentane, dimethylcyclopentane, ethylcyclopentane, cyclohexane, methylcyclohexane, dimethylcyclohexane, ethylcyclohexane, isopropylcyclohexane and cycloheptane; unsaturated alicyclic hydrocarbons such as cyclopentene, cyclopentadiene, cyclohexene, methylcyclohexene, dimethylcyclohexene, ethylcyclohexene, cyclohexadiene, methylcyclohexadiene and cycloheptene; terpene hydrocarbons; linear ethers such as diethyl ether, dipropyl ether, diisopropyl ether, dibutyl ether, diisobutyl ether and dipentyl ether; trichlorotrifluoroethane; propyl chloride; etc. Among these, the aforementioned saturated aliphatic hydrocarbons, unsaturated aliphatic hydrocarbons, saturated alicyclic hydrocarbons, unsaturated alicyclic hydrocarbons and linear ethers are preferred. Of these, those having boiling points of 180° C. or lower are particularly preferred for their readiness in forming recording layers. These solvents may be used either singly or in combination.

By the way, no particular limitation is imposed on the lower limit of the solubility parameter. However, at least 6.8 is preferred in view of the solubility in phthalocyanine dyes.

In the present invention, it is feasible to use a solvent having a solubility parameter of 8.5 or greater in combination with one or more of the above-described organic solvents having solubility parameters smaller than 8.5. For example, one or more of the above-described organic solvents may be used in combination with one or more of solvents having solubility parameters of 8.5 or greater, e.g., aromatic hydrocarbons such as benzene, toluene, xylene and ethylbenzene; ester type solvents such as ethyl acetate, butyl acetate, amyl acetate, ethylene glycol monoethyl ether acetate; ketone type solvents such as acetone, methyl ethyl ketone, methyl isobutyl ketone, cyclohexanone and isophorone; alcohol type solvents such as ethyl alcohol, propyl alcohol, butyl alcohol, amyl alcohol, ethylene glycol monomethyl ether, ethylene glycol monobutyl ether and benzyl alcohol; chloroform; carbon tetrachloride; methylene chloride; methylchloroform; trichlene; tetrachloroethylene; dichloroethylene; dichloroethane; tetrachloroethane; tetrahydrofuran; dioxane; diglyme; dimethylformamide; etc. Needless to say, their mixing proportions must be adjusted to maintain the solubility parameter of the mixed solvent at a value smaller than 8.5.

When two or more solvents are used as a mixture in this invention, the solubility parameter of the mixed solvent should be the sum of the products of the volume fractions of the individual solvents mixed and the solubility parameters of the respective solvents, namely, the value determined by the following equation (1):

$$\delta = V_1\delta_1 + V_2\delta_2 + V_3\delta_3 + \ldots + V_n\delta_n \quad (1)$$

where $V_1, V_2, V_3, \ldots, V_n$: volume fractions of the respective solvents in a mixed solvent.

$\delta_1, \delta_2, \delta_3, \ldots, \delta_n$: solubility parameters of respective solvents in the mixed solvent.

In the present invention, the concentration of the dye solution may generally be 0.1–10 wt.% or preferably 0.3–5 wt.% although it may vary depending on the solvent and coating technique. Upon preparation of the dye solution, it may be possible to use one or more other soluble dyes in the above-described dye solution in a total amount not impairing the effects of the present invention, for example, in a range less than about 50% so as to increase the reflectance of the recording layer or to improve its sensitivity. As dyes usable in combination with those of the present invention, may be mentioned those already known in the art, for example, aromatic or unsaturated aliphatic diamine-metal complexes, aromatic or unsaturated aliphatic dithiol-metal complexes, polymethine dyes, squarylium dyes, naphthoquinone dyes, anthraquinone dyes, and so on. When one or more of these dyes are added, it is preferable to choose a solvent which can dissolve both of such chosen dye or dyes and the dye of this invention.

In order to increase the smoothness of a recording layer or to reduce defects such as pinholes in the recording layer in the present invention, it is possible to add a soluble resin such as nitrocellulose, ethylcellulose, an acrylic resin, polystyrene, a vinyl chloride-vinyl acetate copolymer, polyvinyl acetate, polyvinyl butyral or a polyester resin and other additives such as a levelling agent and anti-foaming agent to a solution of the phthalo/naphthalocyanine dye of this invention or if necessary, to a solution of the phthalo/naphthalocyanine dye and the above-mentioned other dye or dyes upon formation of the recording layer. However, an incorporation of one or more of these resins and additives in any amounts beyond necessity will result in a significant reduction in the reflectance of the resulting recording layer or will lead to the prevention of the dye particles from uniform dissolution in the recording layer and lead to dispersion of the dye particles so that the recording sensitivity or reflectance will be reduced. It is therefore preferred to limit the total proportion of one or more of such resin binders and additives to lower than 20 wt.%, preferably below 10 wt.%, more preferably below 5 wt.% in the recording layer. In other words, the total proportion of the amount of the phthalo/naphthalocyanine dye and the amount of the above-mentioned dye, which is usable in combination with the phthalo/naphthalocyanine dye, in the recording layer of this invention is at least 80 wt.% and up to 100 wt.%, preferably 90 wt.%–100 wt.%, more preferably 95 wt.%–100 wt.%.

In order to fix (form) a recording layer on a transparent substrate in the process of this invention for the fabrication of an optical recording medium, it is necessary, for example, to bring a dye solution formed of one of the above phthalo/naphthalocyanine dyes and a subsequently-described organic solvent into contact with the substrate so that the dye is coated and fixed on the substrate. More specifically, this may be done, for example, by letting the dye solution flow down over the substrate or bringing one side of the substrate into contact with the dye solution and then pulling it up from the dye solution, followed by rotation of the substrate to remove any excess solution, or by sending down the dye solution onto the rotating substrate. Here, the organic solvent employed to dissolve the phthalo/naphthalocyanine dye and contained in the recording layer is conveniently allowed to evaporate substantially completely while removing any excess solution, usually, by rotation or the like since the thickness of the recording layer is very small. However, if necessary, the recording layer may then be dried by heating.

In the optical recording medium fabricated by the process of this invention, it is preferred to write and read out signals by a laser beam through the transparent substrate (i.e., laser beam irradiated on the recording layer through the substrate). In this case, if the recording layer becomes too thick, the writing laser beam is absorbed as it passes through the thick recording layer. As a result, the writing laser beam undergoes substantial attenuation and cannot sufficiently reach the surface of the recording layer at which surface the recording layer is in contact with air. The light quantity is hence insufficient on the surface and the temperature increase is thus insufficient, thereby failing to form pits or holes satisfactorily in accordance with signals. As a result, the sensitivity is reduced or even if recording is barely feasible, the S/N ratio (signal-to-noise ratio) is too small upon reading out signals to make the recording medium unsuitable for practical application.

When the recording layer is unduly thin, it is impossible to achieve sufficiently high reflectance on the recording layer due to interference of light as will be discussed herein. Hence, no large S/N ratio can be obtained.

It is therefore preferable to form the recording layer with a suitable thickness. In the optical recording layer of this invention, the thickness of the recording layer may preferably be 50–400 nm or more preferably 60–250 nm as an approximate standard.

There are various methods for the measurement of the thicknesses of layers. It is however very difficult to determine accurate thicknesses by measurement. For the practice of this invention, it is preferred to use values measured by using an Ellipsometer or by measuring cross-sections of media through a microscope. Measurement of thicknesses becomes particularly difficult when pregrooves are formed in substrates. In this case, the measurement can be substituted by determining the thickness of the layer that has been obtained by fixing the same dye on a substrate of the same type without pregrooves.

One of features of this invention resides in that the thus-formed recording layer has a high reflectance by itself. Hence, the recording layer itself also serves as a reflective layer.

Unlike conventional optical recording media using an organic dye as recording layer, the optical recording medium fabricated in accordance with the process of this invention permits the focal point control of a laser beam and the track control of signal-writing positions upon recording signals or reading them out without any reflective layer such as thin metal layer or thin metal oxide or metal alloy layer.

In order to write signals in an optical recording medium, it is usually necessary to irradiate a laser beam focused on its recording layer. Since the dye in the recording layer absorbs the laser beam and produces heat at the irradiated spot, pits or holes are formed in the recording layer and the reflectance of the recording layer is changed by the formation of said pits or holes. Signals can be read out by detecting the changes in reflectance by means of a laser beam. If these variations in reflectance are small, the signal-to-noise ratio (S/N ratio) is generally small. This is certainly not preferred.

Here, it is noteworthy that the mode of variations in reflectance of an optical recording medium upon performing recording thereon, namely, the mode of variations in reflectance upon formation of pits or holes varies considerably depending on the structure of the recording layer of the optical recording medium. In the case of a double-layered medium composed of a light-reflecting layer and light-absorbing layer such as that disclosed in U.S. Pat. No. 4,219,826, a reflective layer which has previously been covered by the light-absorbing layer is exposed upon formation of pits or holes in the light-absorbing layer. After the recording, the reflectance has thus been increased at spots which correspond to pits or holes. In such a case, it is sufficient for the initial reflectance (i.e., the reflectance prior to the formation of pits or holes) to be approximately of such a level that permits control of a laser beam. On the other hand, in a so-called single-layered optical recording medium which has no reflective layer the recording layer serves not only as a light-reflecting layer but also as light-absorbing layer as in the present invention, the above description must be reversed completely. By the formation of pits or holes, the reflectance of the recording layer is lowered there. Namely, the reflectance of the recording layer where pits or holes are formed becomes lower than the inherent reflectance. For obtaining a large S/N ratio under the above situation, the reflectance through its associated substrate is at least 10% or preferably 15% or higher in a state prior to writing signals thereon. This reflectance of at least 10% or preferably 15% or higher can be easily achieved by using the dye of this invention and preferably by making a suitable selection as to the thickness of the recording layer. However, the reflectance changes depending on the thickness of the recording layer due to the interference of light reflected at both front and back surfaces of the recording layer. In this case, the measurement of reflectance was conducted by using a light source of the same wavelength as that employed in recording, fixing a recording layer on a transparent substrate free from pits or holes and pregrooves, and measuring the reflectance through the transparent substrate by means of a spectrophotometer equipped with a 5° regular reflection accessory. The term "reflectance" as used herein shall be considered to mean a value measured in the above manner. When the light is irradiated through the substrate, its reflection takes place at the interface between the substrate and recording layer and also at the interface between the recording layer and air. These two rays of reflected light interfere each other. Therefore, the reflectance of the recording layer varies depending on its thickness. It is hence possible to obtain a large reflectance in the present invention by making a suitable selection as to the thickness of the recording layer.

On the other hand, FIG. 1 shows the wavelength dependency of the reflectance and transmittance of a recording layer obtained by coating an octane solution of tetra-6-tert-heptyl-2,3-naphthalocyaninevanadyl dye, which is useful in the practice of this invention, to a thickness of 120 nm on a smooth acrylic resin substrate of 1.2 mm thick. This recording layer had a broad absorption in the wavelength range of 730–850 nm. This absorbing wavelength range is in good conformity with the oscillation wavelengths of semiconductor lasers. The reflectance in this wavelength range is above 13%. A reflectance of 15% or greater is achieved especially within a range of 780–850 nm. As apparent from FIG. 1, it is understood that the recording layer of this invention has sufficient absorption and reflectance in the oscillation wavelength range of laser beams even when it has not been vapor-treated (shifting treatment).

When a polymeric binder is contained in a large proportion of 40–99 wt.% or preferably 60–99 wt.% as disclosed in U.S. Pat. No. 4,492,750, the associated dye is not evenly dissolved in the binder and particles of the dye are in a state dispersed therein. Thus, the spectroscopic characteristics of the dye are not in agreement with the oscillation wavelength of a laser beam unless the dye particles are vapor-treated. Where the proportion of the resinous binder is in a far smaller proportion of from 0 wt.% (inclusive) to 20 wt.% (exclusive) as in the present invention, the present inventors have unexpectedly found that large absorption takes place in the oscillation wavelength range of laser beams without vapor treatment even if the similar dye is employed. Although the reasons for the above phenomenon have not been fully made clear, the state of intermolecular association of the dye or its crystalline structure appears to change considerably depending on the amount of the associated polymeric binder. Another significant feature of this invention resides in the possibility of formation of a recording layer by practically using only the phthalo/naphthalocyanine dye without substantial use of any resinous binder.

When a layer formed singly of an organic dye is prepared by vacuum evaporation or the like, the resultant layer is usually inferior in mechanical properties. For this reason, a resin has heretofore been added as a binder in a large amount to the organic dye to improve the mechanical properties of the resulting dye layer. The recording layers, formed practically of the specific phthalo/naphthalocyanine dyes only, have been found to have sufficient mechanical properties, though they contain far smaller amounts of a binder, or do not contain such a binder at all. Therefore, they can be successfully used as optical recording media.

When the optical recording medium fabricated by the process of this invention is provided for actual use, it may be feasible to provide an anti-reflecting layer to improve its S/N ratio. Further, to protect the recording layer, it may be feasible to coat a u.v. curable resin on the recording layer or to apply a protective sheet on the surface of the recording layer or to bond two optical recording media with their recording layers facing inside. When two optical recording media are bonded to each other, it is desirable to bond them together with an air gap on their recording layers.

By the way, the laser beam useful in writing or reading out is a semiconductor laser beam having an oscillation wavelength in the range of 730–870 nm or preferably 750–860 nm. When writing is made at 5 m/s for example, the writing laser power on the surface of the substrate may be about 4 mW–12 mW or so. The reading laser power may be about one tenth the writing power and may thus be about 0.4–1.2 mW or so.

Certain preferred embodiments of this invention will hereinafter be described by the following Examples.

EXAMPLE 1

(1) A solution consisting of 3 parts by weight of tetra-6-tert-heptyl-2,3-naphthalocyaninevanadyl dye and 97 parts by weight of octane (solubility parameter: 7.54) was dripped to a surface of a polycarbonate resin substrate having a thickness of 1.2 mm and a diameter of 130 mm, The surface contained a spiral pregroove (depth: 70 nm, width: 0.6 μm, pitch: 1.6 μm) formed upon injection molding of the substrate. The polycarbonate resin substrate was thereafter rotated for 10 seconds at 1000 rpm to form a recording layer. The polycarbonate resin substrate was then dried for 10 minutes in an atmosphere of 40° C. to fix the recording layer on the polycarbonate resin substrate. The thickness of the recording layer was found to be 90 nm by a measurement of its cross-section at a smooth area free of pits or holes with a microscope. The reflectance of light having a wavelength of 830 nm through the polycarbonate resin substrate was 21%.

(2) The thus-fabricated optical recording medium was mounted on a turn table with its recording layer up. While it was rotated at 900 rpm, pulsated signals of 1 MHz were recorded by means of an optical head equipped with a semiconductor laser having an oscillation wavelength of 830 nm and a power of 8 mW on the surface of the substrate. During the writing, the optical head was controlled in such a way that the laser beam was allowed to focus on the recording layer through the polycarbonate resin substrate. Thereafter, the above-recorded signals were read-out by using the same apparatus in the same manner except that the semiconductor laser power was reduced to 1.0 mW on the surface of the substrate. In the above reading-out, the signal-to-noise ratio (S/N ratio) was 54 dB. Extremely good writing and reading of signals were performed.

(3) In order to investigate the durability of the optical recording medium, it was left over for 4 months under atmosphere condition of 60° C. and 95% R.H. and signals were then recorded in an unrecorded area in the same manner as above. The signals recorded before the durability test and those recorded subsequent to the durability test were read-out respectively. They gave S/N ratios of 53 dB and 52 dB respectively. Thus, the change caused by the durability test was very small.

(4) Furthermore, the shapes of pits at the signal-recorded area were observed by a scanning electron microscope after the durability test. Their shapes were substantially the same as those recorded before the durability test. In the case of an optical recording medium having a thin film of an inorganic material such as Te as a recording layer, swelling or rim takes place along the edges of pits, perhaps, due to the large thermal conductivity of the recording layer. This swelling causes noise. However, such swelling was practically unobserved and the pits maintained very good configurational integrity.

EXAMPLE 2

An optical recording medium was fabricated in the same manner as in Example 1 by using the same polycarbonate resin substrate as that employed in Example 1 and also the naphthalocyanine dye having 4 substituent groups and M and organic solvents shown in Table 1. Its reflectance and S/N ratio were then measured. Results are summarized in Table 1.

TABLE 1

| Run No. | Phthalo/naphthalocyanine dye Substituent | M | wt. Parts | Organic solvent Kind | wt. parts | SP* value | Results Layer thickness (nm) | Reflectance (%) | S/N (dB) | |
|---|---|---|---|---|---|---|---|---|---|---|
| 1 | tert-heptyl | In | 3 | n-heptane | 97 | 7.4 | 100 | 20 | 52 | Invention |
| 2 | tert-heptyl | Cu | 3 | cyclohexane | 97 | 8.2 | 90 | 18 | 49 | Example |
| 3 | tert-heptyl | Pb | 3 | nonane | 97 | 7.6 | 90 | 17 | 48 | |
| 4 | tert-octyl | VO | 3.5 | diisobutyl ether | 96.5 | 7.8 | 100 | 21 | 51 | |
| 5 | tert-dodecyl | In | 3.5 | isooctane | 96.5 | 6.9 | 100 | 20 | 50 | |
| 6 | octoxy | VO | 3 | isooctane | 97 | 6.9 | 90 | 18 | 51 | |
| 7 | phenoxy | VO | 3 | isooctane | 97 | 6.9 | 90 | 20 | 50 | |
| 8 | triethylsilyl | VO | 3 | isooctane | 97 | 6.9 | 90 | 18 | 48 | |
| 9 | tert-octyl | VO | 3.5 | carbon tetrachloride | 96.5 | 8.6 | 110 | 19 | Unable** to record | Comp. Example |
| 10 | tert-octyl | VO | 3.5 | toluene | 96.5 | 8.9 | 100 | 19 | | |
| 11 | tert-octyl | VO | 3.5 | 1,1,2-trichloroethane | 96.5 | 9.6 | 110 | 19 | | |

*SP value: Solubility parameter calculated by the above formula (1).
**Troubles occured in tracking error signals upon recording, thereby failing to control recording positions successfully.

EXAMPLE 3

Optical recording media were fabricated in the same manner as in Example 1 except that the mixed solvents shown in Table 2 were separately used in lieu of octane. Their reflectances and layer thicknesses were measured and their recording/reproducing performances were evaluated to determine their S/N ratios. Results are given in Table 2.

TABLE 2

| Run No. | Mixed solvent Kind | Mixing proportions (vol. %) | SP value* | Results Layer thickness (nm) | Reflectance (%) | S/N (dB) | Remarks |
|---|---|---|---|---|---|---|---|
| 12 | Hexane | 55 | 8.1 | 120 | 18 | 50 | Invention |
| | Chloroform | 45 | | | | | Example |
| 13 | Cyclohexane | 65 | 8.3 | 100 | 20 | 52 | |
| | Carbon tetrachloride | 35 | | | | | |
| 14 | Octane | 70 | 8.0 | 80 | 18 | 49 | |
| | Benzene | 30 | | | | | |
| 15 | Diisobutyl ether | 75 | 8.3 | 90 | 20 | 50 | |
| | 1,2-dichloroethane | 25 | | | | | |
| 16 | Hexane | 30 | 8.6 | 120 | 18 | Unable** to record | Comp. Example |
| | Chloroform | 70 | | | | | |
| 17 | Cyclohexane | 20 | 8.5 | 120 | 18 | | |
| | Carbon tetrachloride | 80 | | | | | |

TABLE 2-continued

| Run No. | Mixed solvent Kind | Mixing proportions (vol. %) | SP value* | Layer thickness (nm) | Reflectance (%) | S/N (dB) | Remarks |
|---|---|---|---|---|---|---|---|
| 18 | Diisobutyl ether 1,2-dichloroethane | 60 40 | 8.6 | 90 | 20 | | |

*SP value: Solubility parameter calculated by the above formula (1).
**Troubles occured in tracking error signals upon recording, thereby failing to control recording positions successfully.

EXAMPLE 4

An optical recording medium was fabricated and evaluated in the same manner as in Example 1 except that a phthalo/naphthalocyanine vanadyl dye containing, on average, three diamylnaphthalene rings and one unsubstituted benzene ring per molecule was used. The thickness of the resultant recording layer was about 90 nm while its reflectance to light having a wavelength of 780 nm was 19%.

Recording performance was then evaluated in the same manner as in Example 1, by using an apparatus equipped with a semiconductor laser the oscillation wavelength of which was 780 nm. In the test, the S/N ratio was 52 dB, namely, extremely good.

In the present invention, it is possible to form a recording layer by coating a dye solution directly on a thermoplastic resin substrate which has pregrooves and pits or holes. Accordingly, the optical recording medium of this invention fabricated in the above-described manner permits writing and reading of signals without a reflective layer such as thin metal film or thin metal oxide film because its recording layer has a sufficient reflectance by itself. Furthermore, owing to its sufficient reflectance, a large S/N ratio can be obtained. Besides, the optical recording medium fabricated in accordance with this invention is stable to heat and moisture and permits its application over a long period of time.

In addition, swelling is not observed at the edges of pits in a recorded area. This indicates that a large S/N ratio can be obtained and at the same time, the recording density can be improved.

What is claimed is:

1. A process for the fabrication of an optical recording medium permitting writing and reading-out of signals without any reflective layer made of an inorganic compound, which comprises:

(a) providing a phthalo/naphthalocyanine dye represented by the following formula (I):

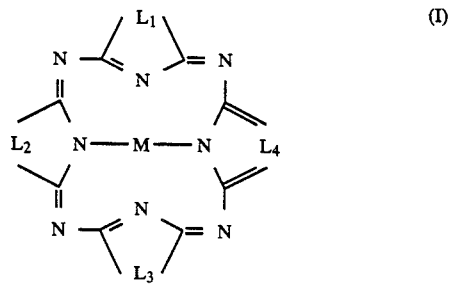

wherein M is a metal, metal oxide or metal halide, and $L_1$, $L_2$, $L_3$ and $L_4$ are each a benzene or naphthalene ring skeleton which is unsubstituted or substituted by at least one monovalent substituent —Z selected from the group consisting of the following substituents: $-R^1$, $-OR^2$, $-SiR^3R^4R^5$, $-SR^6$, $-COR^7$, $-COOR^8$, $-CONHR^9$, $-NR^{10}R^{11}$, $-R^{12}OR^{13}$, and $-R^{14}X$ wherein $R^1-R^{14}$ are each a hydrocarbon group having from 1 to 12 carbon atoms and X is a halogen atom, wherein at least one ring skeleton is substituted, and wherein the total number of carbon atoms in each and all of the substituent or substituents —Z contained per molecule is 20–48;

(b) dissolving the phthalo/naphthalocyanine dye in an organic solvent having a solubility parameter smaller than 8.5, thereby preparing a dye solution; and (c) coating the dye solution on a transparent thermoplastic resin substrate surface having pregrooves, pits or holes which are formed from a thermoplastic resin for preformatting signals, thereby forming a vapor untreated optical recording layer comprising the phthalo/naphthalocyanine dye on the pregroove-, pit- or hole-defining surface of the resin substrate, and wherein the pregrooves, pits or holes in the substrate are formed with a thermoplastic resin.

2. The process as claimed in claim 1, wherein in the phthalo/naphthalocyanine dye represented by the formula (I), the total number of carbon atoms in all the substituent or substituents —Z contained per molecule is 24–48.

3. The process as claimed in claim 1, wherein in the phthalo/naphthalocyanine dye represented by the formula (I), the substituent —Z is $-R^1$, $-OR^2$, $-SiR^3R^4R^5$ or $-SR^6$.

4. The process as claimed in claim 1, wherein in the phthalo/naphthalocyanine dye represented by the formula (I), at least 3 of $L_1$, $L_2$, $L_3$ and $L_4$ are substituted or unsubstituted naphthalene ring skeletons.

5. The process as claimed in claim 4, wherein in the phthalo/naphthalocyanine dye represented by the formula (I), $L_1$, $L_2$, $L_3$ and $L_4$ are substituted or unsubstituted naphthalene ring skeletons.

6. The process as claimed in claim 1, wherein the organic solvent is selected from the class consisting of saturated aliphatic hydrocarbons, unsaturated aliphatic hydrocarbons, saturated alicyclic hydrocarbons, unsaturated alicyclic hydrocarbons and linear ethers, the solubility parameters of which are all smaller than 8.5.

7. The process as claimed in claim 6, wherein the organic solvent is selected from the group consisting of pentane, n-hexane, isohexane, 3-methylpentane, neohexane, 2,3-dimethyl-butane, n-heptane, 2-methylhexane, 3-methyl-hexane, 3-ethylpentane, 2,2-dimethylpentane, 2,3-dimethylpentane, 2,4-dimethylpentane, 3,3-dimethylpentane, 2,2,3-trimethylbutane, n-octane, isooctane, and other isomers of octane, nonane and isomers thereof, decane and isomers thereof, undecane, dodecane, pentene, hexene and isomers thereof, hexadiene and isomers thereof, hexatriene, heptene and its isomers, heptadiene and its isomers, heptatriene, octene and its isomers, octadiene, octatriene, nonene, nonadiene, nonatriene, decene, undecene, dodecene, cyclopentane, methylcyclopentane, dimethylcyclopentane, ethylcyclopentane, cyclohexane, methylcyclohexane, dimethylcyclohexane, ethylcyclohexane, isopropylcyclohexane, cycloheptane, cyclopentane, cyclopentadiene, cyclohexene, methylcyclohexene, dimethylcyclohexene, ethylcyclohexene, cyclohexadiene, methylcyclohexadiene, cycloheptene, terpene hydrocarbons, diethyl ether, dipropyl ether, diisopropyl ether, dibutyl ether, diisobutyl ether, dipentyl ether, trichlorotrifluoroethane and propyl chloride.

8. The process as claimed in claim 6, wherein the pregrooves and pits or holes are formed while molding the substrate.

9. The process as claimed in claim 1, wherein $R^1$–$R^{14}$ are each selected from the group consisting of methyl, ethyl, n-propyl, iso-propyl, n-butyl, iso-butyl, sec-butyl, tert-butyl, n-amyl, iso-amyl, sec-amyl, tert-amyl, n-hexyl, iso-hexyl, 1-methyl-1-ethylpropyl, 1,1-dimethylbutyl, n-heptyl, tert-heptyl, octyl, 2-ethylhexyl, nonyl, decyl and dodecyl, vinyl, allyl, phenyl, methylphenyl, and dimethylphenyl.

10. The process as claimed in claim 1, wherein M is selected from the group consisting of Cu, Mg, Ca, Sr, Zn, Cd, Al, Ga, In, Tl, Ge, Sn, Pb, Ti, Sb, Bi, V, Nb, Ta, Se, Te, Cr, Mo, W, Mn, Tc, Fe, Co, Ni, Ru, Rh, Pd, Os, Ir, Pt and the oxides and halides thereof or a mixture thereof.

11. The process as claimed in claim 10, wherein M is selected from the group consisting of Cu, Ni, Mg, Pd, Co, Nb, Sn, In, Ge, Ga, V, Ti, Al and W and the oxides and chlorides thereof.

12. The process as claimed in claim 1, wherein said organic solvent comprises a mixture of a solvent having a solubility parameter of greater than 8.5, and a solvent having a solubility parameter of less than 8.5, wherein the total solubility parameter is less than 8.5.

13. The process as claimed in claim 1, wherein said organic solvent has a solubility parameter of at least 6.8.

14. The process as claimed in claim 1, wherein said phthalo/naphthalocyanine dye is dissolved in said organic solvent to a concentration of 0.1–10 wt.%.

15. The process as claimed in claim 14, wherein said phthalo/naphthalocyanide dye is dissolved in said organic solvent to a concentration of 0.3–5 wt.%.

16. The process as claimed in claim 1, wherein a soluble resin selected from the group consisting of nitrocellulose, ethylcellulose, an acrylic resin, polystyrene, a vinyl chloride-vinyl acetate copolymer, polyvinyl acetate, polyvinyl butyral and polyester resin; or a levelling agent or anti-foaming agent is added with the phthalo/naphthalocyanine due to the organic solvent such that an amount of less than 20 wt.% is present in the recording layer.

* * * * *